(12) United States Patent
Chakra et al.

(10) Patent No.: US 10,985,692 B2
(45) Date of Patent: Apr. 20, 2021

(54) OPTIMAL SURFACE TEMPERATURE MANAGEMENT

(71) Applicant: International Business Machines Corporation, Armonk, NY (US)

(72) Inventors: Al Chakra, Apex, NC (US); Stephen Mitchell, Chapel Hill, NC (US); Nathaniel Hughes, Raleigh, NC (US); Goutham Siddharthan Balu, Durham, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 87 days.

(21) Appl. No.: 16/142,296

(22) Filed: Sep. 26, 2018

(65) Prior Publication Data

US 2020/0099333 A1 Mar. 26, 2020

(51) Int. Cl.
*G05B 17/02* (2006.01)
*H02S 40/12* (2014.01)
*H05B 1/02* (2006.01)

(52) U.S. Cl.
CPC .............. *H02S 40/12* (2014.12); *G05B 17/02* (2013.01); *H05B 1/0294* (2013.01)

(58) Field of Classification Search
CPC ........ H02S 40/12; G05B 17/02; H05B 1/0294
See application file for complete search history.

(56) References Cited

U.S. PATENT DOCUMENTS

| 9,605,880 B2 | 3/2017 | Van Straten |
| 2011/0056924 A1 | 3/2011 | Townsend |
| 2012/0285516 A1 | 11/2012 | McKarris |
| 2013/0255665 A1 | 10/2013 | Nickel |
| 2014/0041713 A1 | 2/2014 | Adler et al. |
| 2014/0149038 A1* | 5/2014 | Cronin ............. G01W 1/10 702/3 |
| 2015/0364948 A1 | 12/2015 | Kaag |
| 2016/0104084 A1* | 4/2016 | Philip ............. H02S 50/00 705/7.13 |
| 2019/0360739 A1* | 11/2019 | Brown ............. E01D 19/16 |

FOREIGN PATENT DOCUMENTS

| WO | 2011141892 A2 | 11/2011 |
| WO | 2016197013 A1 | 12/2016 |

OTHER PUBLICATIONS

Husu et al. "An Inedited Solution to Increase the Energy Efficiency of Photovoltaic Panels for Regions with Snow" from "2015 13th International Conference on Engineering of Modern Electric Systems (EMES)" (Year: 2015).*

* cited by examiner

*Primary Examiner* — Yuhui R Pan
(74) *Attorney, Agent, or Firm* — Cantor Colburn LLP; Teddi Maranzano

(57) ABSTRACT

A system and method for heating a surface. The system can be a solar panel system and the surface can be a solar panel. The system includes a heat source and a processor. The processor determines an amount of heating energy for removing an accumulated material from the solar panel to obtain an unobstructed solar panel, determines an amount of energy production of the unobstructed solar panel, and controls the heat source to apply the determined amount of heating energy to the solar panel when the determined amount of energy production is greater than the amount of heating energy.

18 Claims, 3 Drawing Sheets

OPTIMAL SURFACE TEMPERATURE MANAGEMENT

BACKGROUND

The present invention relates to surface temperature management, and more specifically, to a system and method for controlling a temperature for clearing ice and snow from a solar panel.

A solar plant uses solar panels that are placed outdoors in order to receive light from the Sun. In cold climates or seasons, snow or ice can form on the solar panels, obstructing light from the Sun from reaching the solar panels and thus reducing electricity production. In such a scenario, a plant employee heats the solar panels to eliminate the accumulation of snow or ice on the solar panel. However, if timed poorly, the energy spent during the day to melt the snow or ice on the solar panel is more than the amount of energy generated by the solar panel during the day after the snow or ice has been melted. There is, therefore, a need for an intelligent energy-efficient approach to reducing snow or ice accumulation on solar panels.

SUMMARY

Embodiments of the present invention are directed to a method of heating a surface, including: determining an amount of heating energy for removing a material accumulated on the surface to obtain an unobstructed surface; determining a benefit for surface utilization; and applying the determined amount of heating energy to the surface when the benefit for surface utilization is greater than the amount of heating energy.

Embodiments of the present invention are directed to a system for heating a surface. The system includes a heat source associated with the surface and a processor. The processor is configured to determine an amount of heating energy for removing a material accumulated on the surface to obtain an unobstructed surface, determine a benefit for surface utilization, and control the heat source to apply the determined amount of heating energy to the surface when the benefit for surface utilization is greater than the amount of heating energy.

Embodiments of the present invention are directed to a solar panel system including a heat source associated with the solar panel, and a processor. The processor is configured to determine an amount of heating energy for removing an accumulated material from the solar panel to obtain an unobstructed solar panel, determine amount of energy production of the unobstructed solar panel, and control the heat source to apply the determined amount of heating energy to the solar panel when the determined amount of energy production is greater than the amount of heating energy.

DETAILED DESCRIPTION

Figure 1:
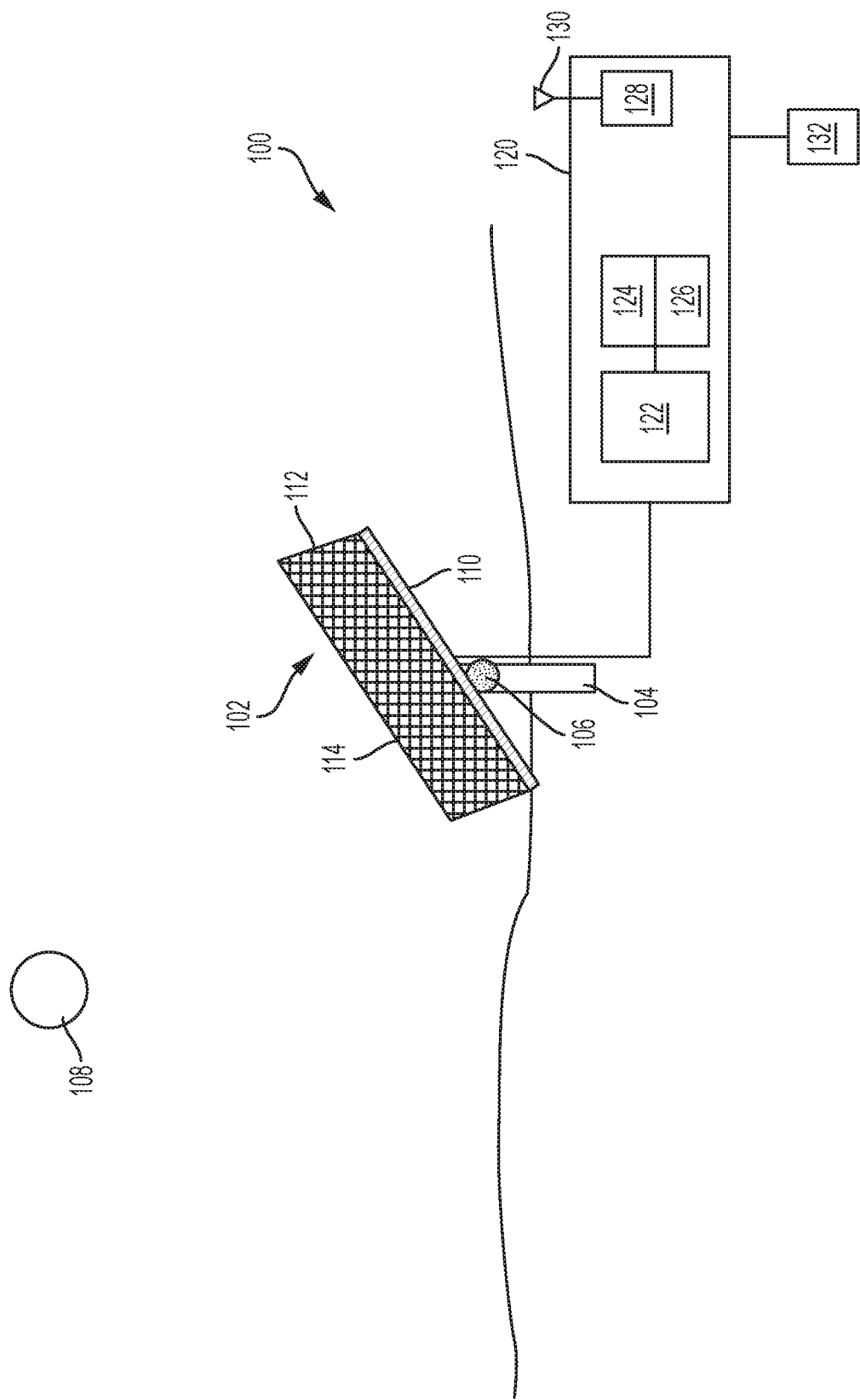
FIG. 1 depicts an illustrative solar panel system in an embodiment.

FIG. 1 depicts an illustrative solar panel system 100 in an embodiment. The solar panel system 100 includes a solar panel 102 coupled to a support structure 104. A gear system 106 couples the solar panel 102 to the support structure 104 and rotates the solar panel 102 in order to track the Sun 108 as it moves across the sky. The solar panel 102 tracks the Sun 108 by orienting itself such that rays from the Sun 108 are incident perpendicular or substantially perpendicular to an energy-producing surface 112 of the solar panel 102. The solar panel 102 further includes a heating panel 110 or other heating device. The solar panel 102 is shown to have an accumulation of a material 114 such as snow and/or ice that obstructs rays of light from the Sun 108 from reaching the energy-producing surface 112 of the solar panel 102. The material 114, therefore, inhibits the solar panel 102 from generating solar energy. The heating panel 110 can be used to melt the material 114 from the energy-producing surface 112 of the solar panel 102, thereby increasing the ability of the solar panel 102 to generate solar energy.

A control unit 120 is in communication with the heating panel 110 and controls its operation. The control unit 120 includes a processor 122 and a memory storage device 124 accessible to the processor 122. The memory storage device 126 includes various programs and/or instructions that, when accessed by the processor 122, enable the processor 122 to perform various calculations for controlling the heating panel 110 based on the calculations. The control unit 120 can further include a receiver 128 and antenna 130 for receiving various data that may be used by the processor 122 in its calculations, such as weather conditions, etc. The control unit 120 further comprising an input/output device 132 that allows manual input of information.

Figure 2:
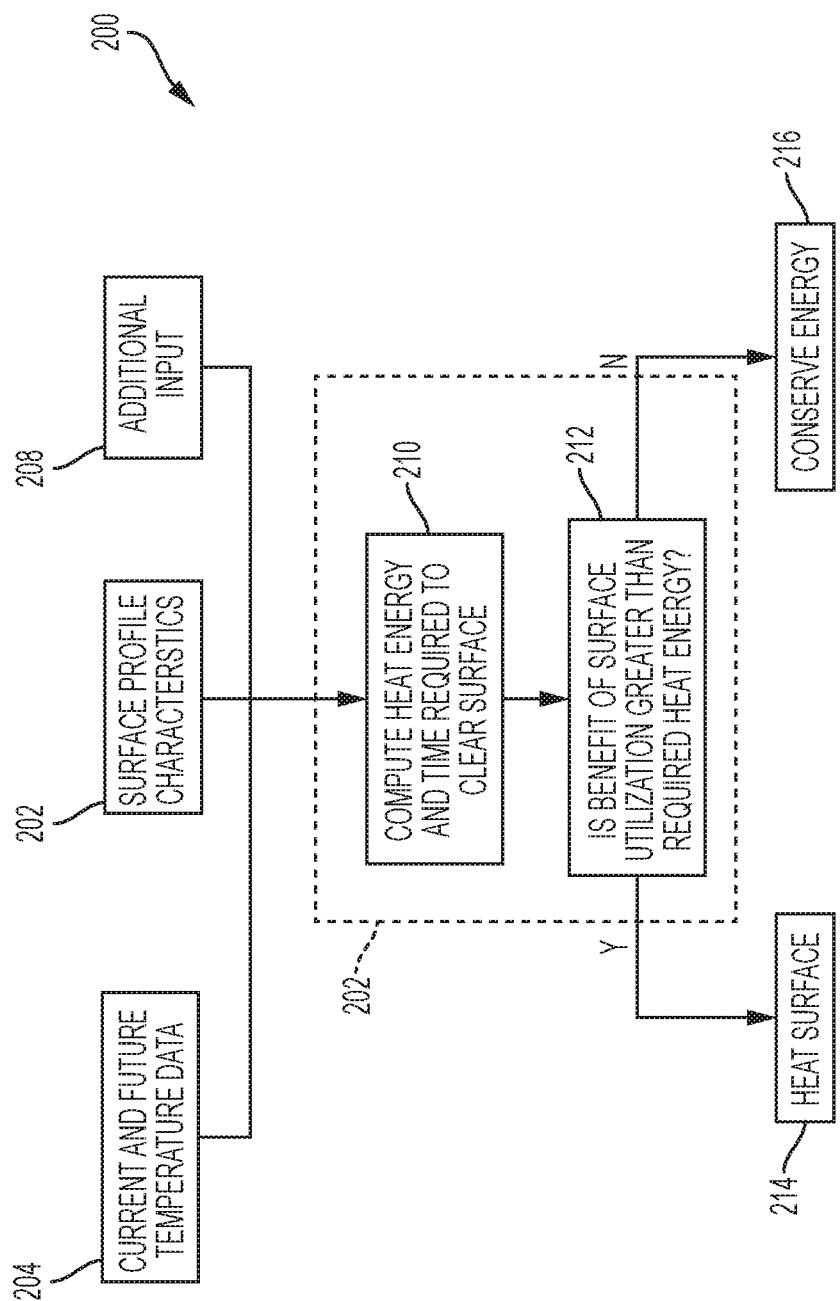
FIG. 2 shows a schematic diagram illustrating a decision engine for controlling heating of the solar panel system of FIG. 1.

FIG. 2 shows a schematic diagram 200 illustrating a decision engine (box 202) for controlling the heating panel 110 of the solar panel system 100 of FIG. 1. The decision engine (box 202) can be an algorithm run on processor 122. The decision engine (box 202) receives a weather input (box 204) and a surface profile input (box 206) in order to perform calculations and make decisions. The weather input (box 204) can include current and future temperature data, as well as data such as estimated sunrise time, estimated sunset time, a precipitation forecast, a forecast of an amount of overcast or cloudiness, etc. The surface profile input (box 206) includes information regarding the snow and/or ice at the solar panel 102. Such information can include snow and/or ice heat capacities, density of snow packing, the height and weight of the snow and/or ice accumulated on the solar panel 102, etc.

In various embodiments, additional input (box 208) can be provided to the decision engine (box 202). The additional input (box 208) can include, for example, the current angle of the solar panel with respect to a selected axis or plane such as the horizon, and the current power needs of the community or of a device powered by the solar panel 102. The additional input (box 208) can further include a time requirement (tf) by which the material 114 needs to be removed from the solar panel 102.

The decision engine (box 202) therefore receives the weather input (box 204), surface profile input (box 206) and any additional input (box 208) and computes (in box 210) an amount of heating energy (e) necessary to melt the snow and/or ice, an optimal or substantially optimal time (to) at which to begin the melting process, and a rate (de/dt) at which to change the application of the heating energy over time. The decision engine then compares the required heating energy to the benefits for use to the surface in order to determine whether or not to proceed to applying the heating energy (box 212). In various embodiments, the decision engine compares the heating energy requirement to an amount of energy that can be produced at the solar panel once the snow and/or ice has been removed. If the amount of producible energy at the solar panel after removal is greater than the heating energy, then the surface is heated (box 214). Otherwise, the surface is not heated and the energy for heating the surface is conserved (box 216). In alternate embodiments, the decision engine compares the cost of heating the solar panel to an expected monetary return due to energy produced from the unobstructed solar panel in order to decide whether or not to heat the solar panel. The energy e, start time to and heating rate (de/dt) can be selected in order to maximize a difference between energy production from the solar panel and heating energy. In various embodiments, the processor 122 obtains frequent weather updates and recalculates energy e, start time to and heating rate (de/dt) based on the latest weather updates.

In one embodiment, the decision engine 202 performs a calculation to estimate a rate of snow melt (M) over a selected time (e.g., hours): An exemplary snow melting equation is shown in Eq. (1):

$$M=\Delta t/24 C_M(T-T_b)$$  Eq. (1)

where M is the rate of snow melt, $C_M$ is a daily melt coefficient for snow, T is a current air temperature, $T_b$ is a current snow temperature and $\Delta t$ is a selected time frame (in hours). The snow temperature $T_b$ is a controllable variable and can be used to increase the snow melt rate (M). If the energy required to increase M in a given time $\Delta t$ is less than the energy that can be generated by the unobstructed solar panel 102 in the given time $\Delta t$, then the decision engine 202 selects to apply heating energy to melt the accumulated material 114 (as in box 214). If the energy required to increase M in $\Delta t$ is more than the energy that would be captured by the unobstructed solar panel in $\Delta t$, then the energy is conserved (as in box 216).

In other embodiments, a different equation for snow melting can be used based on a selected scenario. While the decision engine is discussed herein with respect to a solar panel, the decision engine can be applied to other scenarios. For example, the surface can be an airport runway, and the decision engine can compare a cost of airline business lost due to accumulated snow and/or ice to a cost of heating the runway in order to decide whether or not to melt the material from the runway. In other embodiments, the decision engine can be applied to a driveway or towards heating a vehicle.

Figure 3:
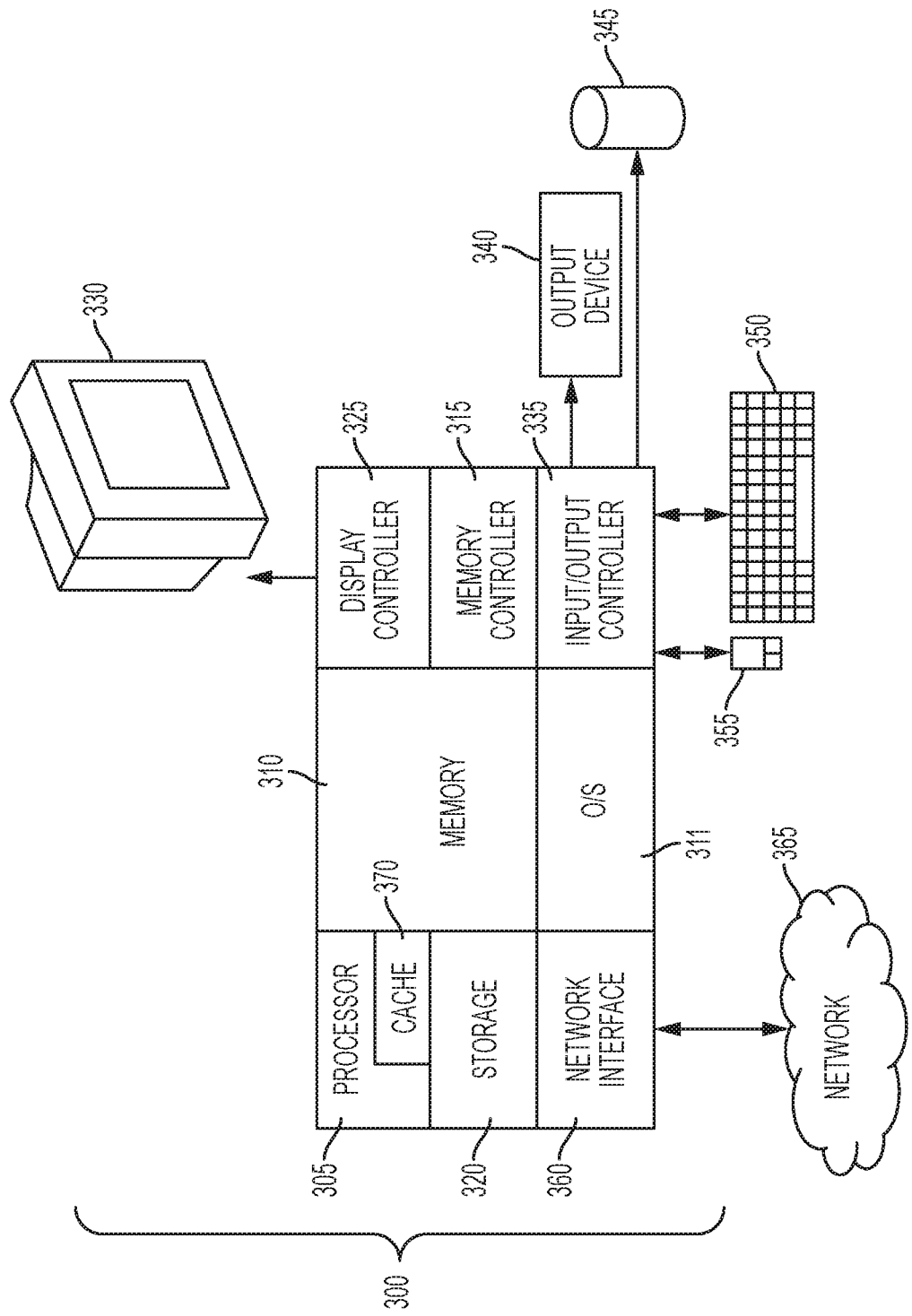
FIG. 3 illustrates a block diagram of a computer system for use in implementing a system or method according to some embodiments.

FIG. 3 illustrates a block diagram of a computer system 300 for use in implementing a system or method according to some embodiments. The systems and methods described herein may be implemented in hardware, software (e.g., firmware), or a combination thereof. In some embodiments, the methods described may be implemented, at least in part, in hardware and may be part of the microprocessor of a special or general-purpose computer system 300, such as a personal computer, workstation, minicomputer, or mainframe computer.

In some embodiments, as shown in FIG. 3, the computer system 300 includes a processor 305, memory 310 coupled to a memory controller 315, and one or more input devices 345 and/or output devices 340, such as peripherals, that are communicatively coupled via a local I/O controller 335. These devices 340 and 345 may include, for example, a printer, a scanner, a microphone, and the like. Input devices such as a conventional keyboard 350 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in memory 310. The processor 305 may be a custom made or commercially available processor, a central processing unit (CPU), an auxiliary processor among several processors associated with the computer system 300, a semiconductor based microprocessor (in the form of a microchip or chip set), a macroprocessor, or other device for executing instructions. The processor 305 includes a cache 370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 370 may be organized as a hierarchy of more cache levels (L1, L2, etc.).

The memory 310 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, or other types of storage media. Note that the memory 310 may have a distributed architecture, where various components are situated remote from one another but may be accessed by the processor 305.

The instructions in memory 310 may include one or more separate programs, each of which comprises an ordered listing of executable instructions for implementing logical functions. In the example of FIG. 3, the instructions in the memory 310 include a suitable operating system (OS) 311. The operating system 311 essentially may control the execution of other computer programs and provides scheduling, input-output control, file and data management, memory management, and communication control and related services.

Additional data, including, for example, instructions for the processor 305 or other retrievable information, may be stored in storage 320, which may be a storage device such as a hard disk drive or solid state drive. The stored instructions in memory 310 or in storage 320 may include those enabling the processor to execute one or more aspects of the systems and methods of this disclosure.

The computer system 300 may further include a display controller 325 coupled to a display 330. In some embodiments, the computer system 300 may further include a network interface 360 for coupling to a network 365. The network 365 may be an IP-based network for communication between the computer system 300 and an external server, client and the like via a broadband connection. The network 365 transmits and receives data between the computer system 300 and external systems. In some embodiments, the network 365 may be a managed IP network administered by a service provider. The network 365 may be implemented in a wireless fashion, e.g., using wireless protocols and technologies, such as WiFi, WiMax, etc. The network 365 may also be a packet-switched network such as a local area network, wide area network, metropolitan area network, the Internet, or other similar type of network environment. The network 365 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in computer systems 300, such as that illustrated in FIG. 3.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of heating a surface, comprising:
   determining an amount of heating energy for removing a material accumulated on the surface to obtain an unobstructed surface based at least in part upon a forecasted weather condition;
   determining a benefit for surface utilization;
   based on determining that the benefit for surface utilization is greater than the amount of heating energy, applying the determined amount of heating energy to the surface; and
   based on determining that the benefit for surface utilization is not greater than the amount of heating energy, periodically obtaining an update to the forecasted weather condition and repeating the determining steps,
   wherein determining the amount of heating energy includes determining a start time for initiating application of the heating energy; an initial value of the heating energy; and a rate of change of energy application (de/dt).

2. The method of claim 1, wherein the surface is a surface of a solar panel, the method further comprising determining amount of producible energy of the unobstructed surface and applying the determined amount of heating energy to the surface when the determined amount of producible energy is greater than the amount of heating energy.

3. The method of claim 2, further comprising determining a procedure for melting the material that maximizes or substantially maximizes a difference between producible energy and the heating energy.

4. The method of claim 1, wherein the material is at least one of snow and ice.

5. The method of claim 1, wherein the amount of heating energy is dependent upon at least one of: (i) a density of the material; (ii) a heat capacity of the material; (iii) an amount of the material; (iv) a depth of the material.

6. The method of claim 2, wherein the producible energy is dependent upon at least one of: (i) a projection of further accumulation; (ii) an overcast condition of the sky; (iii) a remaining amount of daylight.

7. The method of claim 1, further comprising comparing a cost of heating energy to a cost of producible energy.

8. A system for heating a surface, comprising:
   a heat source associated with the surface; and
   a processor configured to:
      determine an amount of heating energy for removing a material accumulated on the surface to obtain an unobstructed surface based at least in part upon a forecasted weather condition;
      determine a benefit for surface utilization; and
      based on determining that the benefit for surface utilization is greater than the amount of heating energy, control the heat source to apply the determined amount of heating energy to the surface; and
      based on determining that the benefit for surface utilization is not greater than the amount of heating energy, periodically obtaining an update to the forecasted weather condition and repeating the determining steps,
   wherein determining the amount of heating energy includes determining a start time for initiating application of the heating energy; an initial value of the heating energy; and a rate of change of energy application (de/dt).

9. The system of claim 8, wherein the surface is a surface of a solar panel and the processor is further configured to determine amount of producible energy of the unobstructed surface and apply the determined amount of heating energy to the surface when the determined amount of producible energy is greater than the amount of heating energy.

10. The system of claim 9, wherein the processor is further configured to determine a procedure for melting the material that maximizes or substantially maximizes a difference between producible energy and the heating energy.

11. The system of claim 8, wherein the material is at least one of snow and ice.

12. The system of claim 8, wherein the amount of heating energy is dependent upon at least one of: (i) a density of the material; (ii) a heat capacity of the material; (iii) an amount of the material; (iv) a depth of the material.

13. The system of claim 9, wherein the producible energy is dependent upon at least one of: (i) a projection of further accumulation; (ii) an overcast condition of the sky; (iii) a remaining amount of daylight.

14. The system of claim 8, wherein the processor is further configured to compare a cost of heating energy to a cost of producible energy.

15. A solar panel system, comprising:
   a heat source associated with the solar panel; and
   a processor configured to:

determine an amount of heating energy for removing an accumulated material from the solar panel to obtain an unobstructed solar panel based at least in part upon a forecasted weather condition;

determine amount of energy production of the unobstructed solar panel; and based on determining that the benefit for surface utilization is greater than the amount of heating energy, control the heat source to apply the determined amount of heating energy to the solar panel; and based on determining that the benefit for surface utilization is not greater than the amount of heating energy, periodically obtaining an update to the forecasted weather condition and repeating the determining steps, wherein determining the amount of heating energy includes determining a start time for initiating application of the heating energy; an initial value of the heating energy; and a rate of change of energy application (de/dt).

16. The solar panel system of claim 15, wherein the processor is further configure to determine a cost of removing the accumulated material and an expected monetary return for energy production from the solar panel, and control the heat source to apply the determined amount of heating energy to the solar panel when the cost of removing the accumulated material is less than the expected monetary return.

17. The solar panel system of claim 15, wherein the processor is further configured to control the heat source to apply the determined amount of heating energy to the solar panel when the determined amount of energy production in a selected time period is greater than the amount of heating energy for the selected time period.

18. The solar panel system of claim 15, wherein the processor is configured to determine least one of (i) a start time for initiating application of the heating energy; (ii) an initial value of the heating energy; and (ii) a rate of change of energy application (de/dt); based on at least one of: (i) weather data; (ii) surface profile characteristics; and (iii) a time requirement.

* * * * *